US009827876B2

(12) United States Patent
Madaras

(10) Patent No.: US 9,827,876 B2
(45) Date of Patent: Nov. 28, 2017

(54) VEHICLE SAFETY SEAT

(71) Applicant: Stephen Madaras, Lexington, SC (US)

(72) Inventor: Stephen Madaras, Lexington, SC (US)

( * ) Notice: Subject to any disclaimer, the term of this patent is extended or adjusted under 35 U.S.C. 154(b) by 0 days.

(21) Appl. No.: 15/066,503

(22) Filed: Mar. 10, 2016

(65) Prior Publication Data

US 2017/0259704 A1 Sep. 14, 2017

(51) Int. Cl.
| | | |
|---|---|---|
| *B60N 2/427* | (2006.01) | |
| *B60N 2/02* | (2006.01) | |
| *B60N 2/10* | (2006.01) | |
| *B60R 21/18* | (2006.01) | |
| *B60R 21/02* | (2006.01) | |
| *B64D 11/06* | (2006.01) | |
| *B63B 29/04* | (2006.01) | |

(52) U.S. Cl.
CPC ............ *B60N 2/0276* (2013.01); *B60N 2/10* (2013.01); *B60N 2/42736* (2013.01); *B60N 2/42772* (2013.01); *B60R 21/18* (2013.01); *B60N 2002/0268* (2013.01); *B60R 2021/0273* (2013.01); *B60R 2021/0293* (2013.01); *B63B 29/04* (2013.01); *B63B 2029/043* (2013.01); *B64D 11/062* (2014.12)

(58) Field of Classification Search
CPC .... B60N 2/0276; B60N 2/10; B60N 2/42736; B60N 2/42772; B60N 2002/0268; B60R 21/18; B60R 21/207; B60R 2021/2074; B60R 2021/0273; B60R 2021/0293; B64D 11/062; B64D 11/06205; B63B 29/04; B63B 2029/043
See application file for complete search history.

(56) References Cited

U.S. PATENT DOCUMENTS

| | | | | |
|---|---|---|---|---|
| 3,623,768 A | * | 11/1971 | Capener | ................ B60R 21/207 280/730.2 |
| 3,837,670 A | * | 9/1974 | Hilyard | ................... B60R 21/02 280/753 |
| 3,981,520 A | * | 9/1976 | Pulling | ................ B60N 2/4221 180/274 |
| 4,215,835 A | | 8/1980 | Wedgwood | |
| 5,415,366 A | | 5/1995 | Mastrolia | |
| 5,605,372 A | | 2/1997 | Al-Abdullateef | |
| 5,636,424 A | | 6/1997 | Singer et al. | |

(Continued)

*Primary Examiner* — Philip Gabler
(74) *Attorney, Agent, or Firm* — Global Intellectual Property Agency, LLC; Jordan Sworen

(57) ABSTRACT

A vehicle safety seat for protecting a vehicle occupant from injury due to impact and airborne debris, in the event of a collision. The vehicle safety seat includes a seat bottom, a backrest, and a headrest, wherein the seat is secured to a frame. The frame is pivotally secured to the floor and frame of a vehicle, wherein the seat can recline immediately in advance of a collision for absorbing impact forces. The safety seat further includes telescoping shields that are retractably secured to the lateral sides of the seat bottom, backrest, and headrest. The shields are projected from the safety seat, creating a protective cocoon around the seat occupant prior to a collision. The seat is operably connected to one or more sensors that can detect an imminent collision between the vehicle and another object, wherein a pneumatic system deploys the shields and an electro-mechanical system reclines the seat.

14 Claims, 4 Drawing Sheets

(56) References Cited

U.S. PATENT DOCUMENTS

| | | | |
|---|---|---|---|
| 5,743,554 A * | 4/1998 | Friedrich | B60R 21/02 |
| | | | 280/730.1 |
| 6,033,017 A * | 3/2000 | Elqadah | B60N 2/2222 |
| | | | 297/216.1 |
| 6,416,127 B1 | 7/2002 | Galbreath, Jr. et al. | |
| 7,077,430 B2 * | 7/2006 | Johansson | B60N 2/005 |
| | | | 280/748 |
| 8,240,736 B2 | 8/2012 | Coenen | |
| 8,297,698 B2 | 10/2012 | Swierczewski | |
| 8,820,830 B2 * | 9/2014 | Lich | B60N 2/0276 |
| | | | 297/216.1 |
| 8,985,622 B1 * | 3/2015 | Cannon | B60N 2/4882 |
| | | | 280/730.2 |
| 2013/0093224 A1* | 4/2013 | Dainese | B60R 21/207 |
| | | | 297/216.12 |
| 2016/0082915 A1* | 3/2016 | Madaras | B60R 21/231 |
| | | | 297/216.2 |

* cited by examiner

VEHICLE SAFETY SEAT

BACKGROUND OF THE INVENTION

Field of the Invention

The present invention relates to vehicle passenger safety devices. More specifically, the present invention provides a reclining vehicle safety seat for absorbing impact forces resulting from a collision and comprising telescoping radial shields that project from the sides of a seat bottom, a backrest, and a headrest in order to create a protective cocoon around a vehicle occupant.

Many individuals use transportation, including cars, buses, trucks and airplanes in order to get from one place to another. However, these modes of transportation can pose dangerous risks and cause serious injuries to passengers upon collision and impact with another object. Passengers may be thrown from the vehicle or may suffer injuries to their person as a result of impact from airborne debris, such as broken glass and objects stored on the interior of the vehicle. Furthermore, rigid seats cause injury, such as immediate or delayed neck and back pain, upon collision due to the force of impact thrusted upon one's body. Therefore, there exists a need in the prior art for a safety seat that can recline and deploy protective shields in the event of a collision in order to protect the vehicle occupant from serious bodily injuries.

Devices have been disclosed in the prior art that relate to safety seats. These include devices that have been patented and published in patent application publications. These devices generally relate to a seat having a frame pivotally secured to a vehicle or portions of the seat are pivotally secured to one another so as to allow the entire seat or portions of the seat to tilt backwards, such as U.S. Pat. No. 8,297,698, U.S. Pat. No. 8,240,736, U.S. Pat. No. 5,636,424, U.S. Pat. No. 5,605,372, and U.S. Pat. No. 6,416,127. Other devices generally relate to an arm restraint net or shroud secured to an aircraft seat adapted to deploy and cover a pilot's arms upon ejection from the aircraft, such as U.S. Pat. No. 5,415,366 and U.S. Pat. No. 4,215,835.

These prior art devices have several known drawbacks. The devices in the prior art fail to provide a vehicle safety seat that reclines immediately in advance of collision and protective side shields adapted to deploy from the seat bottom, backrest and headrest in order to protect a user from airborne debris. Some devices include chairs adapted to recline backwards upon collision, however, such chairs fail to comprise protective telescopic shields therein. Other devices include a seat having a restraint system disposed thereon and adapted to extend over a user's arms, however, the restraint system fails to deploy telescopic side shields configured to prevent debris from injuring a user positioned on the seat. Thus, the prior art devices fail to disclose a vehicle safety seat capable of reducing injury to a user upon collision via an automatically reclining seat that deploys protective shields from the lateral sides thereof.

In light of the devices disclosed in the prior art, it is submitted that the present invention substantially diverges in design elements from the prior art and consequently it is clear that there is a need in the art for an improvement to existing vehicle safety seats. In this regard the instant invention substantially fulfills these needs.

SUMMARY OF THE INVENTION

In view of the foregoing disadvantages inherent in the known types of vehicle safety seats now present in the prior art, the present invention provides a new vehicle safety seat wherein the same can be utilized for providing convenience for the user when seated in a vehicle during a collision.

It is therefore an object of the present invention to provide a new and improved vehicle safety seat that has all of the advantages of the prior art and none of the disadvantages.

It is another object of the present invention to provide a vehicle safety seat comprising a seat having a seat bottom, a backrest, and a headrest, wherein the seat is adapted to be secured in any rolling vehicle or aircraft or seacraft.

Another object of the present invention is to provide a vehicle safety seat further comprising a plurality of telescopic shields, wherein a pair of telescopic shields are projected from opposing lateral sides of the seat bottom, the backrest, and the headrest in order to protect a vehicle seat occupant during a collision.

Yet another object of the present invention is to provide a vehicle safety seat further comprising one or more sensors adapted to detect an imminent collision and generate a signal to activate a pneumatic system that deploys the shields and reclines the vehicle seat.

Yet another object of the present invention is to provide a vehicle safety seat having a frame that is pivotally secured to a floor of a vehicle so as to allow the seat to recline upon activation in order to absorb impact and inertial forces resulting from impact with another object.

Another object of the present invention is to provide a vehicle safety seat that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
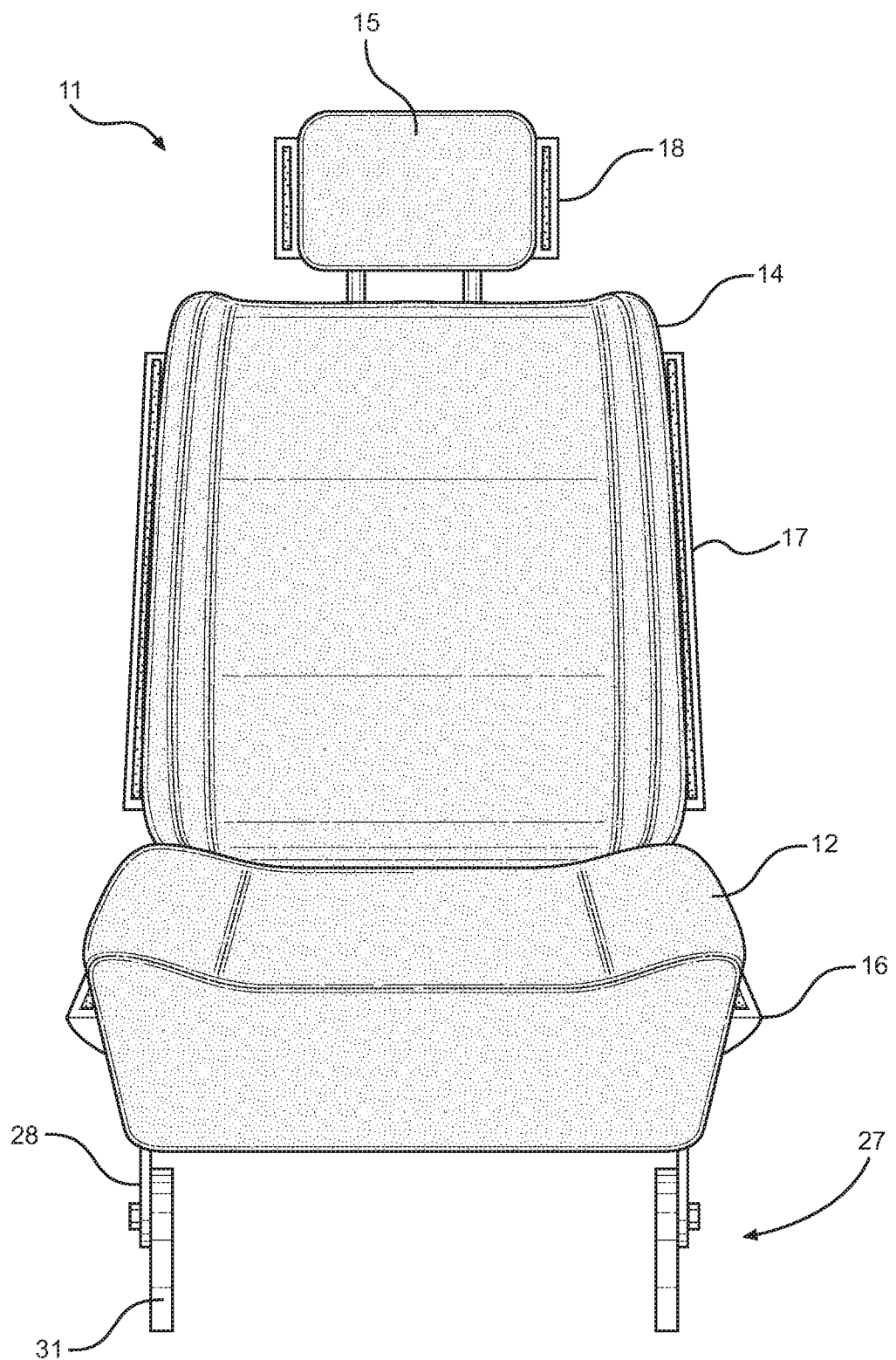
FIG. 1 shows a front view of an embodiment of the vehicle safety seat wherein the seat is in an upright position and the telescopic shields are disposed in a retracted configuration.

Reference is made herein to the attached drawings. Like reference numerals are used throughout the drawings to depict like or similar elements of the vehicle safety seat. For the purposes of presenting a brief and clear description of the present invention, the preferred embodiment will be discussed as used for protecting a user by changing the user impact position of the user and preventing airborne debris from injuring the user during a vehicle collision. The figures are intended for representative purposes only and should not be considered to be limiting in any respect.

Figure 2:
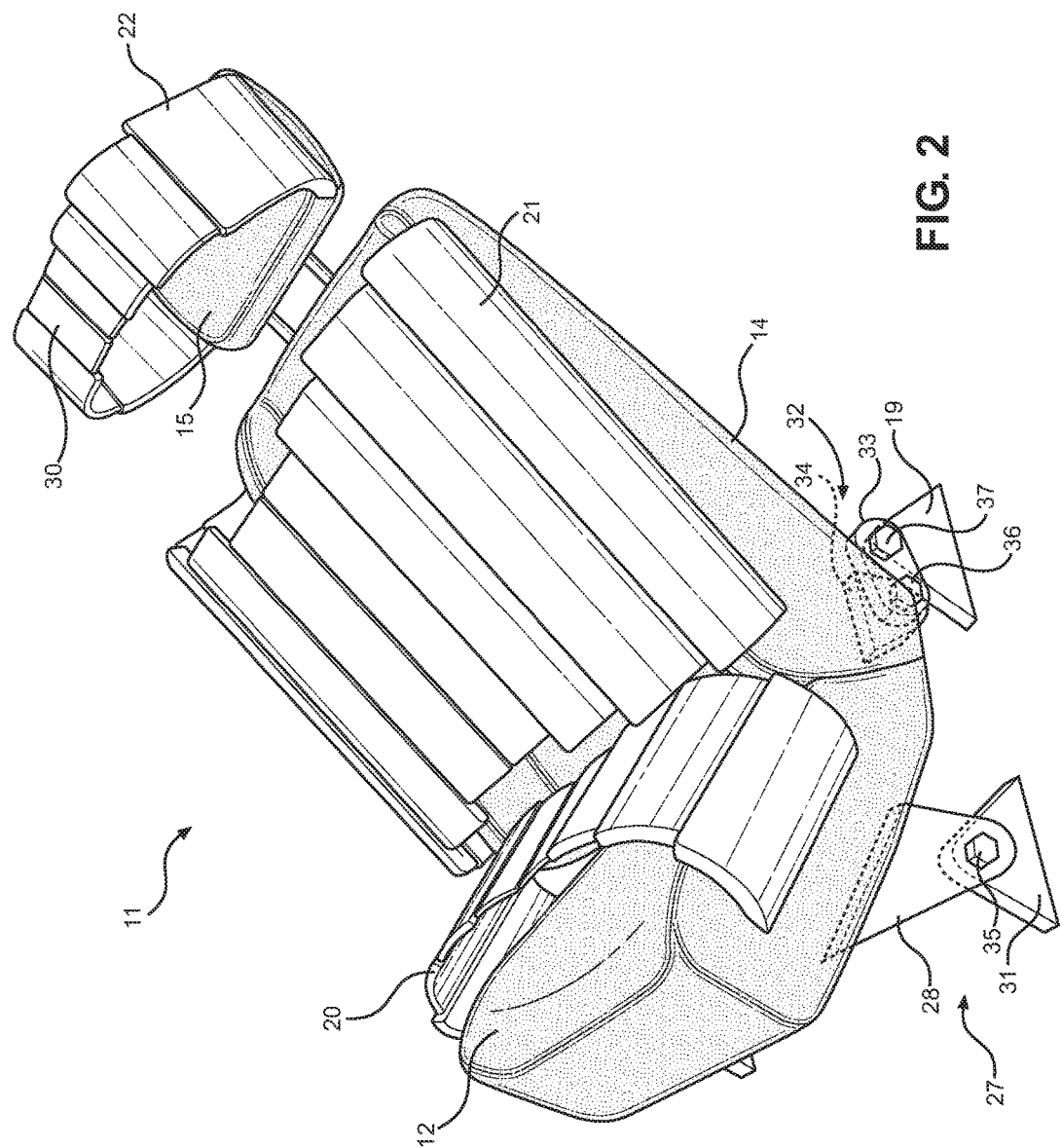
FIG. 2 shows a perspective view of an embodiment of the vehicle safety seat wherein the seat is in a reclined position and the telescopic shields are deployed.

Referring now to FIGS. 1 and 2, there is shown a front view of an embodiment of the vehicle safety seat wherein the seat is in an upright position and the telescopic shields are disposed in a retracted configuration and a perspective view of an embodiment of the vehicle safety seat wherein the seat is in a reclined position and the telescopic shields are deployed. The vehicle safety seat 11 comprises a seat bottom 12, a backrest 14, and a headrest 15, wherein the seat bottom 12 is configured to support a user thereon. The backrest 14 is configured to allow the back of the user to remain in an upright position and the headrest 15 provides a support for the user to rest his or her head thereon. The vehicle safety seat 11 resembles a conventional vehicle seat. The vehicle safety seat 11 may be installed in any transportation vehicle, including an automobile, trucks, buses, trains, and aircrafts.

The vehicle safety seat 11 comprises a plurality of shield assemblies 20, 21, 22 housed within the seat bottom 12, the seat back 14 and the headrest 15. In the illustrated embodiment, a pair of shield assemblies 20, 21, 22 are disposed on each opposing lateral side of the seat bottom 12, the backrest 14, and the headrest 15. The shield assemblies are movable from a retracted position to a deployed position, wherein the shield assemblies are configured to deploy in the event of an activation signal of an imminent collision. In the illustrated embodiment, the shield assemblies 20, 21, 22 are operably connected to one or more deployment pumps 25, configured to deploy the shields upon the activation signal. The deployment pumps can be the same pumps used to operate a vehicle's airbag system. The shield assemblies are configured to remain in the retracted position during normal driving conditions, when the signal of an imminent collision is not activated. Each shield assembly 20, 21, 22 is configured to deploy from a slot 16, 17, 18 extending from the sides of the seat bottom 12, the backrest 14 and the headrest 15. Once deployed, the shield assemblies 20, 21, 22 comprise an arcuate shape so as to allow the pair of side shield assemblies 20, 21, 22 to surround the sides and front of the occupant's body. The shield assemblies 20, 21, 22 are composed of any suitable rigid material.

Preferably, the shield assemblies 20, 21, 22 are telescopic so as to project radially outward from the corresponding slot 16, 17, 18 and surround a vehicle seat occupant, in the deployed position. In the illustrated embodiment, each shield assembly 20, 21, 22 comprises a plurality of concentric tubular panels 30 telescopically and retractably connected to one another, such that a smaller panel 30 retracts into an adjacent larger panel 30. A panel 30 is configured to retract within an adjacent, larger panel 30 until the shield assembly 20 is fully retracted within its corresponding slot 16. Preferably, each panel 30 is adjustably connected to an adjacent panel 30 by a pneumatic seal for deployment and a spring loaded latch that is biased toward a retracted position. The spring loaded latch retains the shield assemblies 20, 21, 22 in a retracted position. In the deployed position, each pair of shield assemblies 20, 21, 22 are projected from the lateral sides of the seat 11 so as to surround the occupant in the seat 11. In this way, the occupant is protected by the shield assemblies from airborne debris resulting from the collision.

Figure 3A:
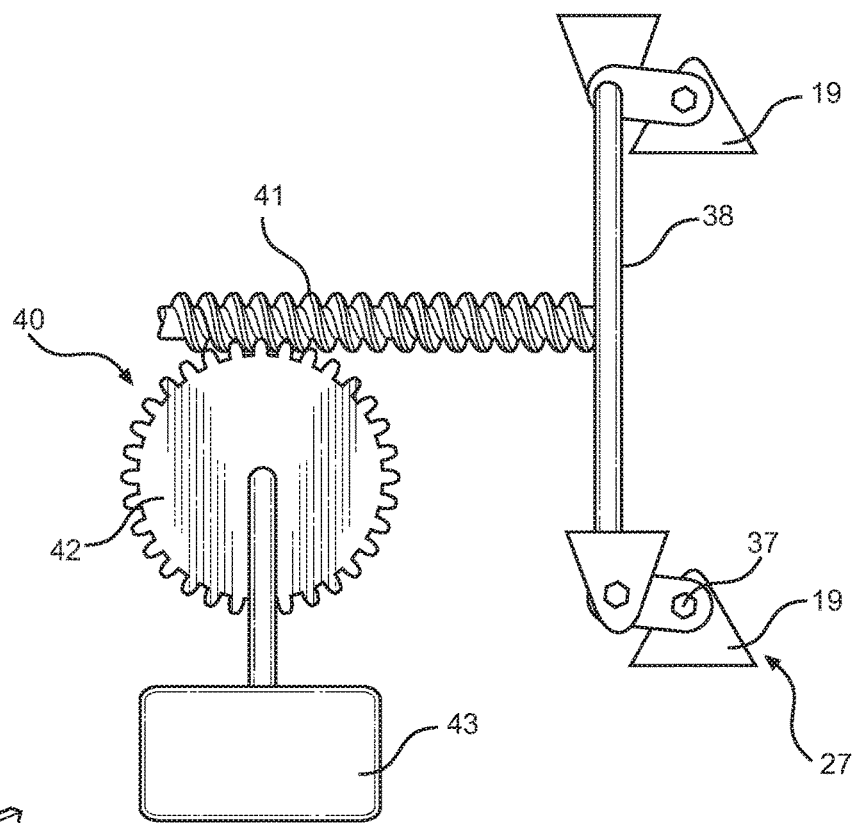
FIG. 3A shows a perspective view of the rear anchor assembly and common rod of the vehicle safety seat in a reclined position.
Figure 3B:
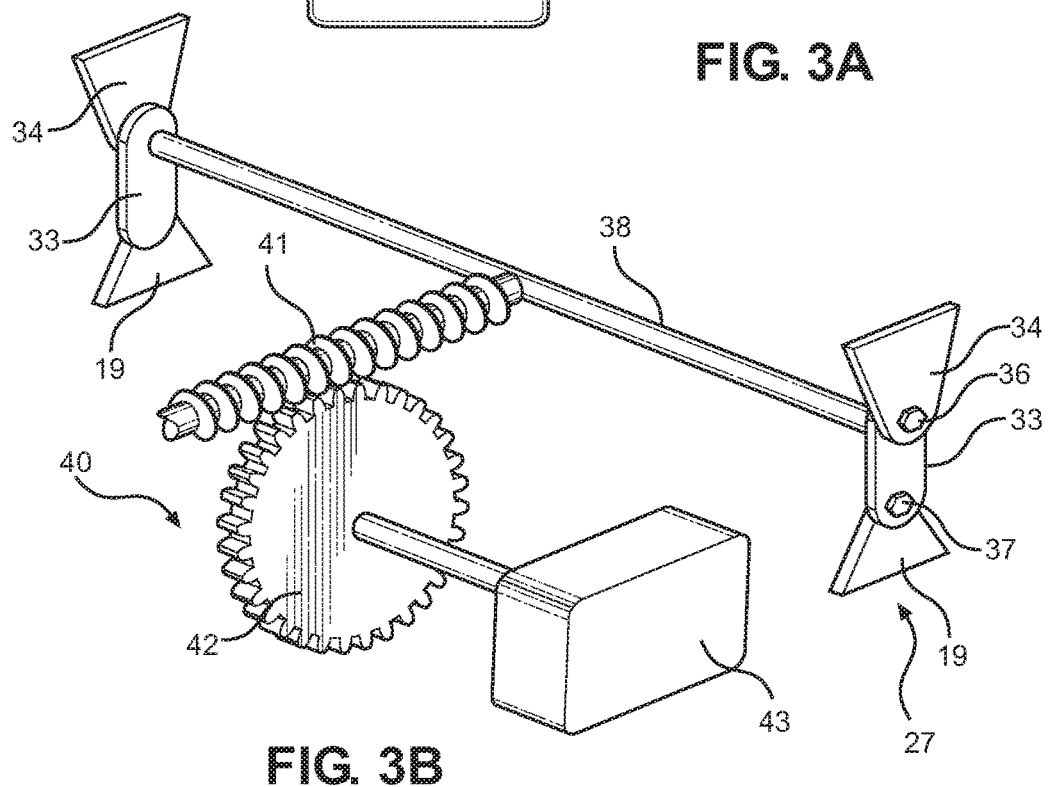
FIG. 3B shows a perspective view of the rear anchor assembly and common rod of the vehicle safety seat in an upright position.

Referring now to FIGS. 2, 3A, and 3B, there is shown a perspective view of an embodiment of the vehicle safety seat wherein the seat is in a reclined position and perspective views of the rear anchor assembly with the common rod in the reclined and upright configurations, respectively. In the illustrated embodiment, the vehicle safety seat 11 further comprises a seat anchor system attached between the seat bottom 12 and adapted to attach to the floor or frame of a vehicle. The seat anchor system comprises a pair of front anchor assemblies 27 having an upper member 28 and a lower member 31, wherein the front anchor assemblies 27 are positioned and attached adjacent to a front end of the seat bottom 12, on opposing lateral sides thereof. The lower member 31 of each front anchor assembly 27 is secured to the vehicle floor or frame and the upper member 28 is secured to the seat bottom 12. The lower member 31 and the upper member 28 are pivotally attached to each other via a fastening pin 35.

The seat anchor system further comprises a pair of rear anchor assemblies 32 having an upper member 34, a lower member 19 and an intermediate member 33, wherein the rear anchor assemblies 32 are positioned and attached adjacent to a rear end of the seat bottom 12, on opposing lateral sides thereof. The lower member 19 of each rear anchor assembly 32 is secured to the vehicle floor or frame. The upper member 34 of each rear anchor assembly 32 is secured to the seat bottom 12. The intermediate member 33 is positioned and pivotally secured between the upper member 34 and the lower member 19 via fastening pins 36, 37. The lower member 19 is pivotally secured to the intermediate member 33 via fastening pin 37 and the upper member 34 is pivotally secured to the intermediate member 33 via fastening pin 36.

A common rod 38 joins the pair of rear anchor assemblies 32 at the joint connecting the upper member 34 and the intermediate member 33 via the fastening pin 36. The common rod 38 extends through an aperture in each member 33, 34, wherein the aperture of each intermediate member 33 is aligned with the aperture of each upper member 34. The common rod 38 further extends through or beneath the seat bottom 12 to the opposing side, thereby connecting to the rear anchor assemblies 32 disposed on the opposing lateral sides of the seat 11.

The common rod 38 is operably connected to and controlled by a high speed electro-mechanical recliner drive 40, such as a worm drive assembly or a rack and pinion drive assembly, enabling a pushing and pulling motion on the common rod 38 that reclines the seat 11 in the event of an activation signal. In the illustrated embodiment, the recliner drive 40 is depicted as a worm drive, wherein the worm drive comprises a worm 41 which is mechanically connected to the common rod 38 and a worm gear 42 operably connected to a motor 43. In alternate embodiments, the recliner drive 40 is a rack and pinion drive, wherein the rack and pinion drive comprises a rack which is mechanically connected to the common rod 38 and a pinion gear operably connected to a motor.

The seat anchor system comprises the front and rear anchor assemblies 27, 32, along with the common rod 38, the seat recliner drive assembly 40 which recline the seat 11 upon an activation signal in order to absorb inertial forces resulting from impact with another object and protect the occupant from injury due to flying objects. However, the depicted embodiment of the present invention is merely illustrative and the present disclosure contemplates other embodiments of the present invention utilizing other front and rear anchor systems and other gears or gear-based mechanisms to pivot or otherwise adjust the angle at which the vehicle safety seat 11 is positioned.

The pivoting front and rear anchor assemblies 27, 32 allow the seat 11 to move between an upright configuration, for normal driving conditions, to a reclined configuration, resulting from an activation signal caused by an imminent vehicle impact. In the upright configuration, the seat bottom 12 is substantially horizontal and the backrest 14 and headrest 15 are substantially vertically disposed in order to allow a user to remain seated as he or she would in a conventional seat. The front and rear anchor assemblies 27, 32 extend vertically upwards so as to allow the seat 11 to remain in an upright position.

In the reclined configuration, the seat 11 is reclined so that the rear side of the seat bottom 12 is lower than when disposed at the upright configuration. The front anchor assemblies 27 are pivotally secured to the seat bottom 12 and the vehicle floor or frame to allow the seat 11 to recline upon activation. The rear anchor assemblies 32, along with the common bar 38 and the seat 11 reclining drive assembly 40, control the reclining of the seat 11 upon activation, to a configuration such that the vertical length of the rear anchor assembly 32 is decreased in order to allow the rear side of the seat bottom 12 to move to a lower position.

Figure 4:
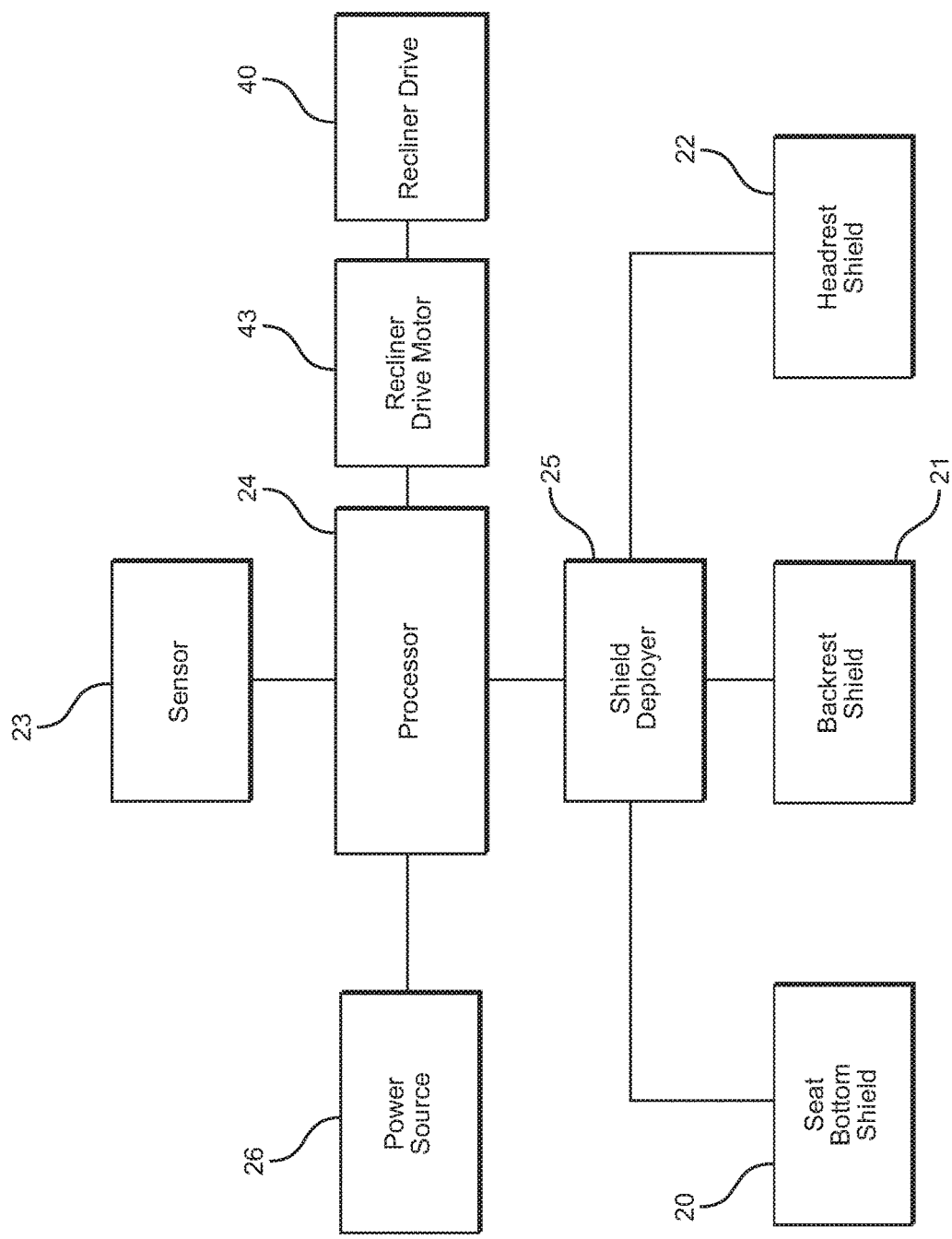
FIG. 4 shows a diagram of the control circuit of the vehicle safety seat.

Referring now to FIG. 4, there is shown a diagram of the control circuit of the vehicle safety seat. The vehicle safety seat further comprises one or more crash sensors 23 adapted to be disposed within the vehicle to detect a collision with another object. The crash sensors 23 measure such stimuli as distance to object, vehicle impact, wheel speed, seat occupant status, brake pressure and impact, and other vehicle status indicators. The sensors 23 are operably connected to a processor 24 which analyzes the measurements of the sensors 23. The processor 24 includes a predetermined threshold measurement for each sensor 23. The processor 24 sends an activation signal to a shield deployer 25 and the seat recliner drive motor 43 in order to deploy the shield assemblies 20, 21, 22 and recline the seat, respectively, if one or more sensor 23 thresholds are surpassed. For example, the shield assemblies 20, 21, 22 will not deploy and the seat will not recline unless vehicle impact is determined to be imminent by the data processor 24. Furthermore, shield assemblies 20, 21 and 22 will not deploy and the seat will not recline unless the one or more seat sensors 23 measure weight resting upon the seat and the processor 24 determines an individual is occupying the seat. The shield deployer 25 and the recliner drive motor are operably independent from one seat to another.

The processor 24 is operably connected to the shield deployer 25, such that the shield deployer 25 is configured to deploy each of the shield assemblies 20, 21, 22 housed within the seat upon receiving the activation signal. Any suitable shield deployer 25 can be used, such as high speed motors and high pressure pumps. Further, the processor 24 is operably connected to the recliner drive motor 43, such that the recliner drive motor 43 is configured to recline the seat upon receiving the activation signal. Any suitable recliner drive motor 43 can be used, such as a high speed motor. A power source 26 powers the processor 24, the shield deployer 25, and recliner drive motor 43, wherein the power source 26 is adapted to electronically connect thereto. The power source 26 may be vehicle generated with a backup of one or more disposable and rechargeable batteries.

The shield assemblies 20, 21, 22 are stored within the seat and the deployment equipment 25 is stored in a remote location. When the control sensors determine an impact is imminent, the deployment equipment 25 activate the seat recliner and the shield assemblies 20, 21, 22 and they extend through slots on the sides of the seat. The shield assemblies 20, 21, 22 have an arcuate shape wherein each side shield assembly 20, 21, 22 is adapted to cover roughly half of the occupant's body. In operation, the crash sensors 23 measure the stimuli and generate a signal, wherein the signal is relayed to the processor 24. If the predetermined thresholds for the sensors 23 are exceeded, the processor 24 signals to the seat recliner and the shield assembly deployer 25 to deploy the seat recliner and the shield assemblies 20, 21, 22. The shield assembly 20 in the seat bottom 12 extend over the lap of a user, the shield assembly 21 in the backrest 14 extend over the torso and chest of the user, and the shield assembly 22 disposed in the headrest 15 extend over the head of the user. Thus, the front and side of the user is held in the seat and enclosed by the shield assemblies 20, 21, 22 protecting the user from airborne debris. Further, upon the signal of an imminent collision, the seat is automatically reclined at the same time as the deployment of the shield assemblies 20, 21, 22. The shield assemblies 20, 21, 22 automatically return to a retracted configuration after a predetermined amount of time. The seat remains in a reclined configuration until a signal is manually initiated to the recliner drive motor.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle safety seat, comprising:
   a seat having a seat bottom, a backrest, and a headrest, wherein the seat is configured to be positioned in a vehicle;
   one or more sensors for determining a collision between the vehicle and another object, wherein said one or more sensors generate an activation signal;
   one or more shield assemblies adjustably connected to the seat and movable between a retracted position wherein the one or more shield assemblies are stored within the seat, and a deployed position wherein the one or more shields assemblies are configured to enclose a portion of a user's body seated on a face of the seat, such that a terminal end of the one or more shield assemblies is parallel to the face of the seat when in the deployed position;
   a shield deployer operably connected to the one or more shield assemblies and configured to deploy the one or more shields assemblies to a deployed position;
   a processor for processing the activation signal received from the one or more sensors and relaying the activation signal to the shield deployer;
   a control circuit operably connecting the processor to the one or more sensors, the shield deployer, and the one or more shield assemblies, such that the one or more sensors detect vehicle operation and status, and relays said status to the processor, wherein the processor activates the shield deployer to deploy the one or more shield assemblies when a predetermined threshold is exceeded for the one or more sensors.

2. The vehicle safety seat of claim 1, wherein a pair of the one or more shield assemblies are each disposed on opposing sides of the seat bottom, the backrest, and the headrest such that each of the pair of the one or more shield assemblies are adapted to completely surround a user seated on the seat.

3. The vehicle safety seat of claim 2, wherein each of the one or more shield assemblies comprise an arcuate shape.

4. The vehicle safety seat of claim 1, wherein a pair of the one or more shield assemblies are each disposed on opposing sides of the seat bottom of the seat such that the one or more shield assemblies are adapted to completely surround legs of a user seated on the seat.

5. The vehicle safety seat of claim 1, wherein a pair of the one or more shield assemblies are each disposed on opposing sides of the backrest such that the one or more shield assemblies are adapted to completely surround a torso and chest of a user seated on the seat.

6. The vehicle safety seat of claim 1, wherein a pair of the one or more shield assemblies are each disposed on opposing sides of the headrest such that the one or more shield assemblies are adapted to completely surround a head of a user seated on the seat.

7. The vehicle safety seat of claim 1, wherein a pair of opposing sides of the seat bottom, the backrest, and the headrest each comprise a slot adapted to allow the one or more shield assemblies to deploy therethrough.

8. The vehicle safety seat of claim 1, wherein each of the one or more shield assemblies comprise a plurality of concentric tubular panels telescopically connected to one another.

9. The vehicle safety seat of claim 1, wherein the shield deployer is a pneumatic pump.

10. The vehicle safety seat of claim 1, further comprising a seat anchor system secured to the seat and configured to secure to a vehicle floor, such that the seat is movable between an upright configuration wherein the backrest of the seat is vertical, and a reclined configuration wherein a rear side of the seat bottom is lower when disposed at the upright configuration.

11. The vehicle safety seat of claim 10, wherein the seat anchor system comprises
a pair of front anchors disposed on opposing sides of the seat and each having an upper member secured to the seat and pivotally secured to a lower member that is configured to secure to the vehicle floor;
a pair of rear anchors disposed on opposing sides of the seat and each having an upper member secured to the seat, a lower member configured to secure to the vehicle floor, and an intermediate member pivotally secured between the upper member and the lower member of a rear anchor;
a common rod disposed through the seat and having a first end connected to a joint connecting a first intermediate member of the pair of rear anchors and a second end connected to a joint connecting a second intermediate member of the pair of rear anchors;
a seat recliner drive operably connected to the common rod and configured to move the common rod.

12. The vehicle safety seat of claim 11, wherein the seat recliner drive is a worm drive having a motor operably connected to the worm drive.

13. The vehicle safety seat of claim 12, wherein the worm drive motor is operably connected to the processor via the control circuit, wherein the processor is configured to relay the activation signal from the one or more sensors to the worm drive motor.

14. The vehicle safety seat of claim 1, wherein a pair of the one or more shield assemblies each have a terminal end, wherein the terminal ends of the pair of the one or more shield assemblies contact one another when in the deployed position.

* * * * *